United States Patent [19]

Dolling

[11] Patent Number: 5,779,064
[45] Date of Patent: Jul. 14, 1998

[54] FASTENING ARRANGEMENT FOR RACKING SYSTEM

[75] Inventor: Vic Dolling, Lincoln, England

[73] Assignee: Dexion Group PLC, Hemel Hempstead, England

[21] Appl. No.: 789,119

[22] Filed: Jan. 27, 1997

[30] Foreign Application Priority Data

Jan. 30, 1996 [GB] United Kingdom ........... 9601857

[51] Int. Cl.$^6$ ................................. A47F 5/00
[52] U.S. Cl. ................ 211/59.2; 211/151; 211/184; 211/187
[58] Field of Search ............... 211/151, 191, 211/190, 189, 184, 187, 59.2

[56] References Cited

U.S. PATENT DOCUMENTS

| | | |
|---|---|---|
| 3,900,112 | 8/1975 | Azzl et al. |
| 4,168,780 | 9/1979 | Parrott ............ 211/151 |
| 4,383,614 | 5/1983 | Miller ............ 211/151 X |
| 4,394,910 | 7/1983 | Miller |
| 4,765,493 | 8/1988 | Kinney |
| 5,090,547 | 2/1992 | Schafer ............ 211/151 X |
| 5,115,920 | 5/1992 | Tipton et al. |
| 5,259,518 | 11/1993 | Sorenson |
| 5,279,430 | 1/1994 | Benton |
| 5,295,591 | 3/1994 | Slater |
| 5,593,048 | 1/1997 | Johnson ............ 211/184 X |

FOREIGN PATENT DOCUMENTS

| | | |
|---|---|---|
| 0044282 | 1/1982 | European Pat. Off. |
| 1287394 | 8/1972 | United Kingdom |
| 1389517 | 4/1975 | United Kingdom |
| 2042874 | 10/1980 | United Kingdom |
| 2281193 | 3/1995 | United Kingdom |
| 82/03540 | 10/1982 | WIPO |
| 8605372 | 9/1986 | WIPO |

*Primary Examiner*—Robert W. Gibson, Jr.
*Attorney, Agent, or Firm*—Wheat, Camoriano, Smith & Beres, PLC

[57] ABSTRACT

Fastening arrangement for securing a roller track (3) of a racking system to a support element (1.2), which support element (1.2) has a flange (4.6). A plurality of resilient tongues (5.8) are regularly spaced along and pressed out from the flange (4.6). The roller track (3) is releasably supported on and held between the tongues (5.8).

10 Claims, 2 Drawing Sheets

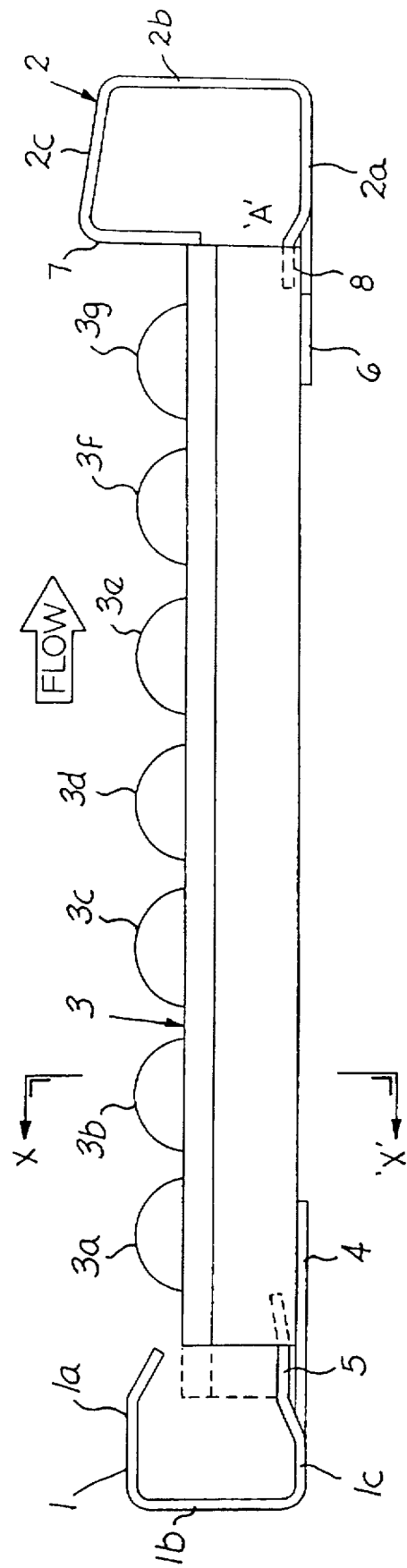
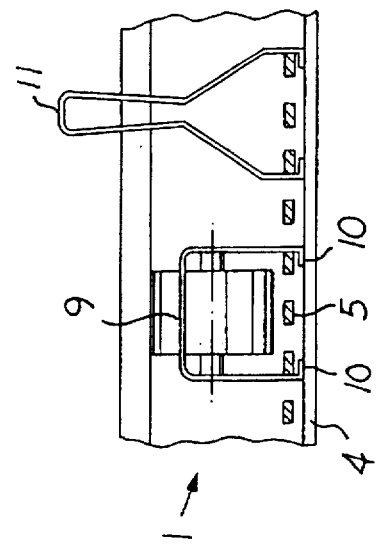
FIG. 2
FIG. 3

FASTENING ARRANGEMENT FOR RACKING SYSTEM

FIELD OF THE INVENTION

The invention relates to fastening arrangement for securing an elongate member of a racking system to a support element disposed substantially perpendicularly to the elongate member, said support member having a substantially planar flange supporting the elongate member.

BACKGROUND OF THE INVENTION

Known designs for fastening elongate members such as conveyor tracks in racking systems tend to be complex and difficult to install economically.

The present invention seeks to provide an arrangement for locating and for securing elongate members such as track of a racking system, that is both cheap to manufacture and versatile to use.

SUMMARY OF THE INVENTION

According to the invention there is provided a fastening arrangement for securing an elongate member of a racking system to a support member, the said elongate member being disposed substantially perpendicularly to the support member, said support member having a flange for supporting the elongate member, said flange having a plurality of tongues spaced there along, said tongues being pressed out of said flange, wherein the elongate member is releasably engageably held on said flange of said support member by a selected one or more of said tongues.

In a preferred embodiment the elongate member is releasably engageably supported at each end by respective support elements each having a flange in which the respective end of the elongate element is supported and held by a selected one or more of the plurality of tongues spaced along said flanges.

Preferably the tongues are regularly spaced from another and may be pressed out from the flange. Preferably one support element includes a stop. Preferably the elongate member comprises a plurality of aligned rollers with their axes being in spaced parallel relationship and lying on a longitudinal axis of the elongate member. The elongate member may comprise side guides to locate loads on said rollers.

DETAILED DESCRIPTION OF THE INVENTION

A preferred embodiment of the invention will now be described by way of example with reference to the drawings, in which FIG. 1 a schematic perspective view of bays of a racking system;

FIG. 2 shows a side view of part of a live storage system;

FIG. 3 shows a cross section of FIG. 2 along X—X.

Figure 1:
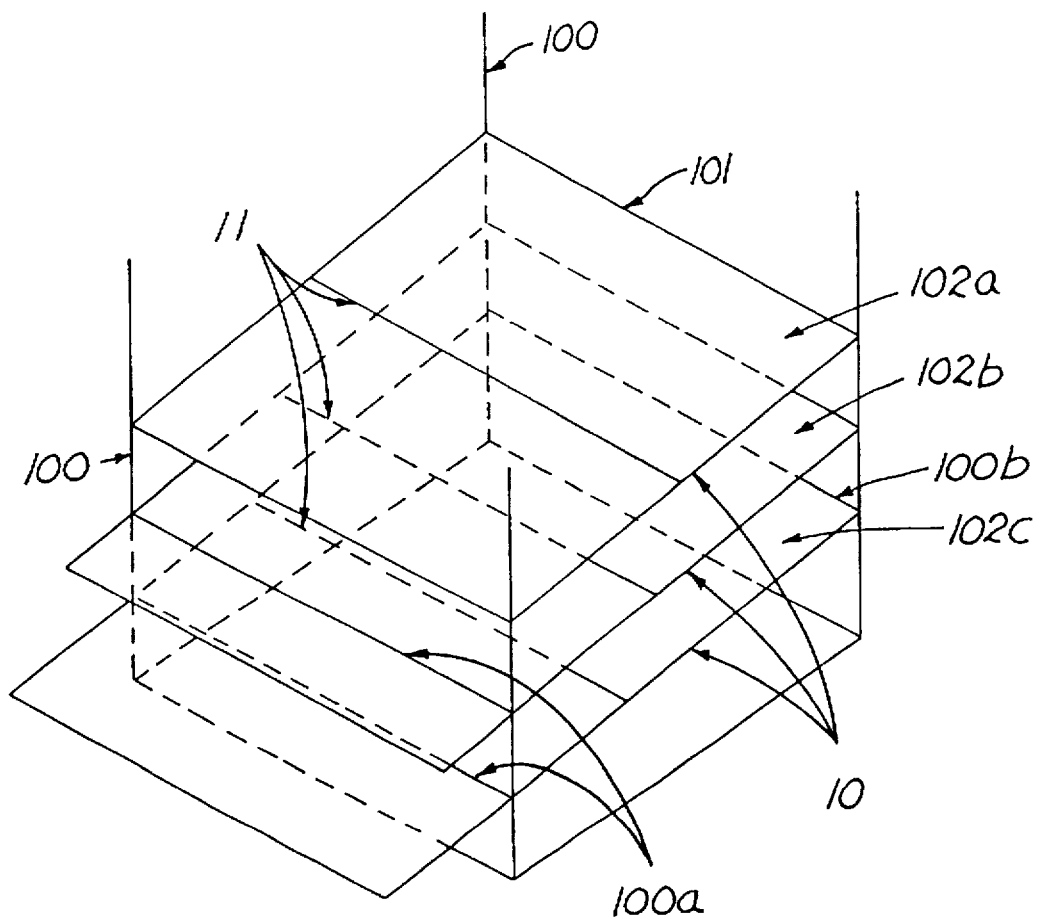

FIG. 1 shows a schematic perspective view of a bay of a racking system, which comprises upright frame members 100 and horizontal transverse frame members 1,2. Located between front frame members 100a and rear frame members 100b are a plurality of vertically spaced beds each having track sections 102, which track sections comprise aligned rows of coaxial rollers which may be additionally supported on transverse crossmembers 11 arranged between load bearing members 10. The track sections are inclined to the horizontal, sloping downwardly from the rear to the front, to provide a live storage system. The load bearing members are connected to the frame members by means of a clip. The track sections may 102 extend beyond the front face of the front frame members, with the lowermost track sections 102c extending the most and the uppermost track section 102a extending least, with the intervening track section having an intermediate extension. Alternatively, the track sections 102 may end flush with the front face of the front frame member.

FIG. 2 shows a side view of part of a live storage system comprising an on-load elongate cross member 1, a pick face elongate cross member 2 and an elongate member supported by the members 1,2 forming a wheel track 3, which comprises a plurality of aligned rollers 3a–g. In use goods, typically in cartons or tote bins, are loaded at the on-load end B and flow under gravity to the pick face A.

The on load cross member 1 is formed of pressed steel plate and comprises a generally U shaped member in cross section having a substantially horizontal upper limb 1a with a free end adjacent to the wheel track 3, wherein the surface at the free end is slightly downwardly bent to provide, in use, a ramp onto the wheel track 3. The upper limb 1a joins a substantially vertical web 1b leading to a lower substantially horizontal limb 1c, which extends out underneath the wheel track 3, thereby forming a flange 4 to support the wheel track. Tongues 5 (see also FIG. 3) are pressed out of the flange of the lower horizontal surface and lie substantially parallel to the surface of the flange. The free ends of the tongues 5 extending in the same direction as the free end of the flange, such that half the length of the tongue extends further from the web 1b than the upper free end 1a. At the free end of the tongue the separation of the tongue and flange increases slightly to facilitate the insertion of the wheel track 3, which is held between the tongue 5 and the flange 4.

The wheel track 3 comprises a plurality of aligned rollers supported within a frame structure. In use, the support members and wheel track are assembled slightly inclined to facilitate the flow of goods from the on load end to the pick face.

The pick face cross member 2 comprises a pressed steel member of generally square tubular section having two substantially horizontal sections and two substantially vertical sections, one horizontal member 2a has a free end forming a flange 6 which extends underneath the wheel track 3, thereby supporting said wheel track. The lower horizontal section 2a joins a vertical section 2b remote from the wheel track 3, which section joins an upper horizontal section 2c. The upper horizontal section 2c then joins the second vertical section, which is located adjacent to and extends below the upper surface of the wheel track 3, thereby forming a stop face 7 for the end of the track and loads on the track. Tongues 8 are pressed out of the web of the lower horizontal surface and flange 6, such that half the length of each tongue extends beyond the plane of stop face 7. The tongues 8 run substantially parallel to the flange 6 and each have a free end pointing in substantially the same direction as the free end of the flange 6. The tongues 8 are approximately half the length of the tongue 5.

When installing the track 3 the end B is inserted under the tongue 5 and moved to the fully engaged position shown in outline in FIG. 2. The track length is such that the end A is then clear of the tongue 8. The track is then moved to engage the tongue 8 until end A abuts the cross member 2, whilst still being retained by the tongue 5. The tongue may be substantially rigid and typically there is a small gap of ca. 1.5 mm between the upper surface of the cross member and the lower surface of the tongue.

FIG. 3 shows a cross section along the line X—X of FIG. 2 in the direction of the arrow, with the flange 4 and on load cross member 1 being visible. Spaced regularly along and raised from the flange 4 are a plurality of said tongues 5. By way of example the tongues are 5 mm wide and spaced 5 mm from one another.

Also shown is a roller track 9 sold under the Interlake brand. This roller is exemplary only and many other brands of roller track are suitable. The inwardly facing flanges 10 of the track 9 locate over and under a set of three tongues. This track type may also be fitted by locating one lower flange under the side of a tongue, and by using the inherent spring in the track cross-section, the opposite lower flange may be stretched over the adjacent tongue to spring back and be located under the said tongue. A guide member 11 is shown, which may be used to locate loads on the rollers, and this may be fitted in analogous fashion. This enables the guide to be cut with square ends and fitted directly on to the tongues of the on load and pick face members, as otherwise, if the guide member were to inserted at one of the ends, it would be necessary to notch away the upper part of the guide, which is costly and inevitably weakens the guide member.

In practice, at least two spaced tracks are used to support a load and two guide members are laterally spaced to retain the loads on the tracks.

The fastening arrangement described provides a simple, cost effective method for mounting tracks of aligned rollers on support members of a racking system, in that the track may simply be pushed onto the tongues, the wheel tracks engaging under the tongues, whence the track is held firmly in position.

What is claimed:

1. A fastening arrangement for securing an elongate member of a racking system to a support member, wherein said elongate member is disposed substantially perpendicularly to the support member, comprising:

a rack support member having a substantially planar flange for supporting the elongate member, and having a plurality of tongues spaced along said support member, said tongues being pressed out of the plane of said flange, and an elongate member releasably held on said flange of said support member by a selected one or more of said tongues, with said elongate member lying between said flange and at least one of said tongues.

2. Fastening arrangement according to claim 1, wherein the elongate member is releasably engageably supported at each end by respective support elements each having a flange in which the respective end of the elongate element is supported and held by a selected one or more of a plurality of tongues spaced along said flanges.

3. Fastening arrangement according to claim 1, wherein the tongues are regularly spaced from one another.

4. Fastening arrangement according to claim 1, wherein the tongues are attached at one end to said flange.

5. Fastening arrangement according to claim 1, wherein at least one support member has a stop.

6. Fastening arrangement according to claim 1, wherein the elongate member comprises a plurality of aligned rollers.

7. Fastening arrangement according to claim 6, wherein the elongate member includes side guides to locate loads on said rollers.

8. Fastening arrangement according to claim 1, wherein the flange is formed of pressed steel.

9. Fastening arrangement according to claim 1, wherein the support member is secured to a racking system.

10. A racking system having a support member with the fastening arrangement of claim 1.

* * * * *